United States Patent [19]
Dunn et al.

[11] Patent Number: 6,082,856
[45] Date of Patent: Jul. 4, 2000

[54] METHODS FOR DESIGNING AND MAKING CONTACT LENSES HAVING ABERRATION CONTROL AND CONTACT LENSES MADE THEREBY

[75] Inventors: Stephen A. Dunn, Point Richmond; Charles E. Campbell, Berkley, both of Calif.

[73] Assignee: Polyvue Technologies, Inc., Larkspur, Calif.

[21] Appl. No.: 09/188,432

[22] Filed: Nov. 9, 1998

[51] Int. Cl.$^7$ .................................................. G02C 7/04
[52] U.S. Cl. ..................... 351/160 H; 351/161; 351/177
[58] Field of Search .......................... 351/160 R, 160 H, 351/161, 162, 177

[56] References Cited

U.S. PATENT DOCUMENTS

| | | | |
|---|---|---|---|
| 4,564,484 | 1/1986 | Neefe | 264/2.6 |
| 5,050,981 | 9/1991 | Roffman | 351/177 |
| 5,191,366 | 3/1993 | Kashiwagi | 351/177 |
| 5,452,031 | 9/1995 | Ducharme | 351/177 |
| 5,517,260 | 5/1996 | Glady et al. | 351/161 |
| 5,815,239 | 9/1998 | Chapman et al. | 351/177 |

OTHER PUBLICATIONS

Charles E. Campbell, "The Effect of Spherical Aberration of Contact Lens to the Wearer", American Journal of Optometry & Physiological Optics, vol. 58, No. 3, pp. 212–217, Mar. 1981.

David A. Atchison, "Aberrations associated with rigid contact lenses", Optical Society of America, vol. 12, No. 10, pp. 2267–2273, Oct. 1995.

George T. Bauer, "Longitudinal Spherical Aberration of Soft Contact Lenses", International Contact Lens Clinic, vol. 6, No. 3, May/Jun. 1979.

George T. Bauer, "Longitudinal spherical aberration of modern ophthalmic lenses and its effect on visual acuity", Applied Optics, vol. 19, No. 13, pp. 2226–2234, Jul. 1, 1980.

George T. Bauer, "Measurement of the longitudinal spherical aberration of soft contact lenses", Optics Letters, vol. 4, No. 7, pp. 224–226, Jul. 1979.

Gerald Westheimer, "Aberrations of Contact Lenses", American Journal of optometry and Archives of American Academy of Optometry, pp. 445–448, Aug., 1961.

*Primary Examiner*—Scott J. Sugarman
*Attorney, Agent, or Firm*—Dike, Bronstein, Roberts & Cushman, LLP; George W. Neuner

[57] ABSTRACT

A method for constructing a soft contact lens having a prescribed power correction for focusing light on the retina of an eye is described. The method provides a soft contact lens that, when in place ("flexed") on the wearer's eye, is designed and manufactured to provide a substantially ellipsoidal anterior surface. In the method, an eye model including a cornea, a crystalline lens and a retina is constructed. Then a shape for an anterior surface of the cornea is selected to be a conic section having an eccentricity in the range of about $0.14 < e < 0.63$. Next, a preliminary soft contact lens is selected having a center thickness, a radius, a posterior contact lens surface and an anterior contact lens surface to provide a prescribed plus or minus correction power such that, when applied to the anterior surface of the cornea, the anterior contact lens surface defining a conic section having a shape factor in the range of $0 < E < 1$ or $-1 < E < 0$. An analysis is performed using the preliminary soft contact lens and eye model tracing light ray paths through the contact lens/eye system. The shape factor of the anterior contact lens surface when applied to the anterior surface of the cornea is varied within the range of $0 < E < 1$ or $-1 < E < 0$ to achieve an contact lens/eye system wherein a trace of light ray paths is optimized for sharpest focus by minimizing a retinal spot size of the rays. Thus, an optimized anterior contact lens surface for the soft contact lens when applied to the anterior surface of the cornea is defined. A thickness profile is calculated for the optimum contact lens using the differences in distance between the anterior surface of the cornea and the optimized anterior contact lens surface at various values of the contact lens radius from the center of the contact lens. Contact lenses having the calculated thickness profile can be made by conventional methods. Both monofocal and multifocal lenses having optimized aberration correction can be made.

36 Claims, 1 Drawing Sheet

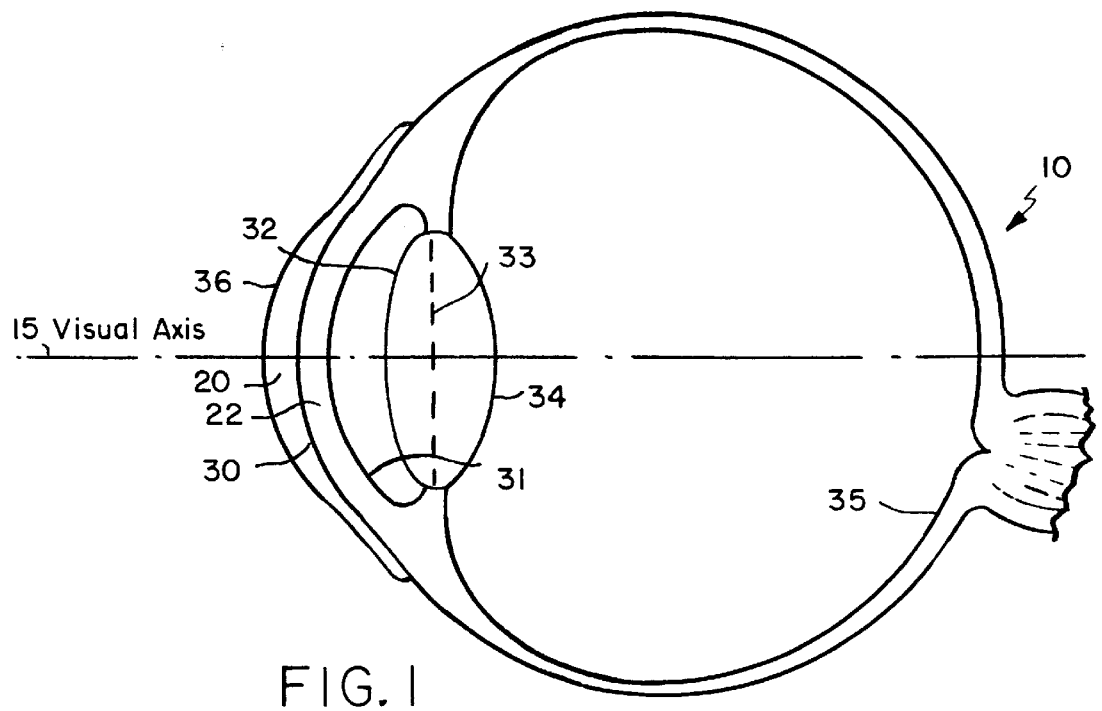
FIG. 1
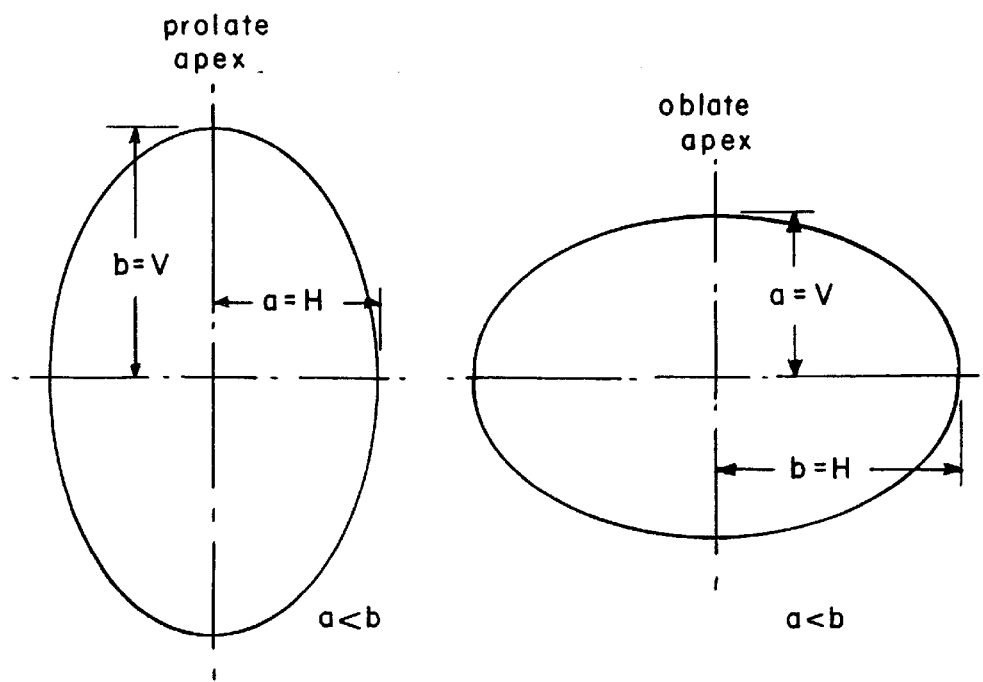
FIG. 2a
FIG. 2b

METHODS FOR DESIGNING AND MAKING CONTACT LENSES HAVING ABERRATION CONTROL AND CONTACT LENSES MADE THEREBY

FIELD OF THE INVENTION

The present invention is related to methods for designing and making contact lenses and lenses made thereby, particularly to methods for designing contact lenses having aberration control and the lenses made thereby.

BACKGROUND OF THE INVENTION

The human eye suffers from the optical defect known as spherical aberration. Spherical aberration is the term used to describe the fact that light rays entering a refracting (focusing) surface such as the cornea are less strongly focused at the center of the refracting surface and progressively more strongly focused off center. This results in a suboptimal image. This image is not clearly focused on one focal point but instead in a series of focal points in front of the intended focal point (i.e., the retina) resulting in "blur circles."

This aberration is primarily caused by the fact that the first surface of the eye, the anterior corneal surface, is a very highly curved optical surface whose effective aperture, the pupil of the eye, typically is a sizeable fraction of the radius of curvature. Such conditions generally lead to undercorrected spherical aberration in which the outer portions of the cornea refract light more strongly than do the central portions and, hence, there is not a common focal point for the whole pupil.

Fortunately, the spherical aberration for the eye in total is less than that introduced by the cornea because the crystalline lens corrects a portion of the aberration leaving less to degrade vision by the time light reaches the retina. The crystalline lens can do this primarily because it is a gradient index. That means that the index of refraction of the crystalline lens is not constant throughout the lens but changes, increasing as light travels from the anterior surface to the center and then decreasing as light passes from the center to the posterior surface. Thus, in the crystalline lens, one may think of the rays of light as being curved inside instead of being straight as they are in common lenses. However, even though a good deal of the aberration is removed depending upon the condition of the crystalline lens, even for a good condition crystalline lens, some does remain and this could be removed by altering the anterior surface of the cornea to make it more elliptical in shape, as discussed by Campbell, C. E. in The effect of spherical aberration of contact lenses to the wearer, *Am. J Optom. and Physiol. Opt.*, 1981, 58:212–17.

The spherical aberration induced by any convex surface is not only a function of the surface curvature but also the convergence of the light as it enters the surface. For instance, purely spherical surfaces generally introduce spherical aberration. But, if light enters a spherical surface with just the right amount of convergence, there is absolutely no spherical aberration induced. This suggests that hyperopes will, in general, exhibit less spherical aberration when corrected with spectacle lenses than will myopes because, for proper correction, light must converge as it enters the eve of a hyperope, whereas it must diverge as it enters the eye of the myope. However this is not true for the contact lens wearer, as was first pointed out by Campbell (1981), supra, and then in more detail by Atchison, *J. Opt. Soc. Am.*, 1995, 12:2267–73.

In fact, spherical aberration is in general less for the myope than for the hyperope who is corrected with contact lenses. This is because one must think of the anterior corneal surface as being replaced by the contact lens and this alters the optical conditions from those conditions experienced when using a spectacle lens. Thus, when a myope is corrected with a contact lens, the effective anterior surface is reduced in curvature so the spherical aberration is thereby decreased. The opposite occurs for a hyperope.

Typically, the curvature of a conventional contact lens surface has been described in terms of "conic sections," which includes the sphere, parabola, ellipse, and hyperbola. All rotationally symmetric conic sections can be expressed in terms of a single equation $$X = \frac{Y^2}{r + [r^2 - (K+1)Y^2]^{\frac{1}{2}}}$$

where X is the aspheric surface point at position Y, r is the central radius, and the conic constant, K, is an aspheric coefficient that relates to the shape factor, E, according to E=–K. This equation defines a curve that, when rotated about the axis Y=0, defines the surface of the conic section. Other conic constants or aspheric coefficients include the eccentricity, e, which is related to K by the equation K=–$e^2$, and the rho factor, $\rho$, which is defined as 1–$e^2$.

The value of the aspheric coefficient determines the form of the conic section. For a sphere, e=0 and K=0. An ellipse typically has an eccentricity between 0 and 1 and a K between 0 and –1. A parabola is characterized by an e=1 (i.e., K=–1). For a hyperbola, e is greater than 1 and K<–1.

Conventionally, most lens surfaces are spherical or near-spherical in curvature. Theoretically, for an infinitely thin lens, a spherical curvature is ideal to sharply focus the light passing through the lens. However, the curvatures and thickness gradations of a real contact lens that provides power correction produce well-known optical aberrations, including spherical aberration, coma, distortion, and astigmatism; i.e., light from a point source passing through different areas of the lens that does not focus at a single point. This causes a certain amount of blurring. Furthermore, purely spherical lenses are not suitable for correcting astigmatic vision or for overcoming presbyopia.

Longitudinal spherical aberration of modern ophthalmic lenses was discussed by Bauer in Applied Optics, Vol. 19, No. 13 (Jul. 1, 1980). He found that longitudinal spherical aberration of those soft and hard contact lenses that have spherical surfaces is substantially larger than that of spectacle lenses. Ray tracing showed that, by applying at least one properly selected aspherical surface, the spherical aberration of contact lenses can be corrected. However, Bauer states that visual acuity is affected also by other aberrations and Bauer suggests that correction of spherical aberration does not influence visual acuity or contrast appreciably.

Nevertheless, the correction of spherical aberration has been considered to be desirable. U.S. Pat. No. 4,434,113 describes a method for spin casting lenses having a reduced spherical aberration. See, also, U.S. Pat. No. 4,564,484.

U.S. Pat. No. 4,1959,119 describes a contact lens with reduced spherical aberration for aphakic patients wherein the contact lens has a rear surface with an eccentricity of 0.5200 and a front surface having an eccentricity defined by a particular formula based on the index of refraction of the contact lens material.

U.S. Pat. No. 3,711,191 describes an ophthalmic lens having aberration correction. The ophthalmic lens has a far vision upper lens portion with a first focal power corrected for aberrations that are specific to far vision, a near vision lower lens portion with a second higher focal power corrected for aberrations that are specific to near vision, and, between those portions, an intermediate vision lens portion with a focal power that progressively varies from said first focal power to said second focal power and being corrected for aberrations specific to vision of an object point progressively drawing nearer to the lens.

U.S. Pat. No. 5,050,981 describes an aspheric lens for providing improved vision and a method for generating the lens using ray tracing techniques. The lens is characterized by a hyperbolic or parabolic surface (i.e., K less than or equal to −1) that functions to reduce spherical aberrations and minimizes the retinal image spot size. The method uses a model of the eye that can be considered as a three lens compound system containing 13 surfaces for the purpose of ray trace analysis. The lens must have one surface that is a symmetric sphere as defined by the formula above where K is less than or equal to −1. The value of the conic constant, $K_K$, is varied to obtain sharpest focus by minimizing the retinal spot size of rays traced using that particular lens/eye model system.

U.S. Pat. No. 5,191,366 describes an aspheric lens and method for producing the lens to remove spherical aberration by arbitrarily controlling the spherical aberration. Ray tracing is performed using an incident ray, a final passing point of the ray is compared with a preset desired final passing point, and a slope of a curved surface corresponding to the points of incidence of the ray is determined so that both final passing points coincide.

However, the curvature of the front surface of any soft contact lens placed on the eye will vary with its power and lens flexure. A minus lens used to correct myopia can reduce the dioptric curvature of the combined soft lens/corneal surface and as a result can reduce the spherical aberration at the eye's front surface.

It is possible for this soft lens/corneal spherical aberration to provide excessive reduction; so much so that minus lens powers cause the compensating power of the crystalline lens to be unopposed. This can result in an overall increased spherical aberration for those eyes. In the case of a plus soft contact lens, used to correct hyperopia, the increased dioptric curvature of the soft contact lens/cornea surface can also increase spherical aberration.

Thus, new and better methods for designing soft contact lenses having spherical aberration control are still being sought to provide soft contact lenses that minimize or eliminate spherical aberration.

SUMMARY OF THE INVENTION

The present invention provides a method for designing and manufacturing a soft contact lens having minimal spherical aberration for the wearer. The preferred embodiments of the present invention provides a soft contact lens having maximized correction for spherical aberration for the wearer whether plus or minus power correction is required by the wearer.

In accord with the present invention, the soft contact lens, when in place ("flexed") on the wearer's eye, is designed and manufactured to provide a substantially ellipsoidal anterior surface (i.e., a surface having a conic section having a shape factor "E" wherein $0<E<1$ or $-1<E<0$) for the eye/lens system. However, when the soft contact lens is removed from the eye, the anterior surface of that lens in its relaxed ("unflexed") state typically will not have that same required shape factor. Thus, the present invention provides a method for designing and making the soft contact lens in the relaxed state so that, when applied to the wearer's eye, it provides the required shape factor and an optimum anterior corrective surface to provide the prescribed plus or minus power correction and minimize spherical aberration.

Thus, in accord with the present invention, a method for constructing a soft contact lens having a prescribed power correction for focusing light on the retina of the eye comprises:

constructing a eye model including a cornea, a crystalline or ophthalmic lens and a retina;

selecting a shape for an anterior surface of the cornea to be a conic section having an eccentricity in the range of about $0.14<e<0.63$;

selecting a preliminary soft contact lens having a center thickness "τ", a radius "r", a posterior contact lens surface and an anterior contact lens surface to provide a prescribed plus or minus correction power such that, when applied to the anterior surface of the cornea, the anterior contact lens surface defining a conic section having shape factor "E" in the range of $0<E<1$ or $-1<E<0$;

performing an analysis using the preliminary soft contact lens and eye model tracing light ray paths through the contact lens/eye system;

varying the shape factor of the anterior contact lens surface when applied to the anterior surface of the cornea to achieve an contact lens/eye system wherein a trace of light ray paths is optimized for sharpest focus by minimizing a retinal spot size of the rays, the shape factor being varied within the range of $0<E<1$ or $-1<E<0$, thereby defining an optimized anterior contact lens surface for the soft contact lens when applied to the anterior surface of the cornea to provide said prescribed plus or minus correction power;

calculating a thickness profile for the optimum contact lens using the differences in distance between the anterior surface of the cornea and the optimized anterior contact lens surface at various values of the contact lens radius from the center of the contact lens; and determining a shape for manufacture of said soft contact lens by selecting a first surface for said soft contact lens and calculating a second surface for said soft contact lens using said first surface and said thickness profile.

A soft contact lens having the thickness profile constructed by the method set orth above can be manufactured conventional molding techniques or machined by conventional techniques from a conventional contact lens blank. First, one of the surfaces of the contact lens is defined. Then, the second surface is defined using the thickness profile calculated by the above described method for designing a soft contact lens. The two surfaces are provided to mold a contact lens or are machined onto a contact lens blank using known conventional methods for making soft contact lenses, taking into account the known hydration properties of the material being used so that the resulting hydrated lens has the desired calculated thickness profile. Any convenient surface can be used for the first surface. Preferably, the first surface is set to be a surface having a regular conic section such as, for example, a spherical surface or an ellipsoidal surface. The second surface is then defined using the first surface and the calculated thickness profile for the lens. The resulting second surface may conveniently be represented by a higher order polynomial equation fitted to the points by a least squares method. Such surfaces can be readily made by conventional lens manufacturing equipment such as, for example, molding by cast molding techniques or machining by numerically controlled machines.

Soft contact lenses designed and manufactured in accord with the present invention provide surprising aberration control characteristics thereby providing unexpectedly improved acuity for many users.

BRIEF DESCRIPTION OF THE DRAWINGS

FIG. 1 is an illustration of an eye model/contact lens system useful for a ray racing analysis in accord with the present invention.

FIG. 2a is an illustration of an ellipse in the prolate orientation.

FIG. 2b is an illustration of an ellipse in the oblate orientation.

DETAILED DESCRIPTION OF THE INVENTION INCLUDING PREFERRED EMBODIMENTS

The present invention provides a method for designing and making a soft contact lens wherein the anterior surface of a soft lens having a particular corrective power, e.g., typically from about −20 D (D=diopters) to about +20 D, and placed on the eye is calculated. Ray tracing is performed on an eye model/contact lens system to calculate the anterior contact lens surface having shape factor for an elliptical curve that provides the selected focal power correction and optimizes the correction of spherical aberration.

A center thickness for the soft contact lens is selected to provide a lens that is as thin as possible for the corrective power while maintaining sufficient strength and handling characteristics for the contact lens in use. Typically, the center thickness of the lens will be in the range of from about 0.02 mm to about 1.0 mm, preferably from about 0.1 mm to about 0.6 mm. However, the optimum thickness will depend upon the properties of the material used to make the contact lens and the corrective power of the soft contact lens, as is well known to those skilled in the art.

The anterior surface of the cornea of the eye model is selected to have an aspheric elliptical surface with an eccentricity in the range of about 0.14 to about 0.63, preferably from about 0.35 to about 0.60, and, most preferably, from about 0.45 to about 0.55.

The present invention uses a method for designing the shape of a soft contact lens by performing ray tracing of light rays through a soft contact lens/eye model system. The methods for ray tracing are well known to those skilled in the optics art. It is convenient to use a computerized ray tracing program. A ray tracing program suitable for use in the methods of the present invention is the Zemax program, which is available from Focus Software, Inc., Tucson, Ariz.

Any eye model system can be used in the practice of this invention. A particularly useful eye model that can be used in the practice of the present invention is that described by Liou, H- L, et al. in *J. Opt. Soc. Am.*, 14:1684–95 (1997).

A relatively simple eye model, based on the eye model of Liou et al., used to calculate the thickness profile of contact lenses in accord with a preferred embodiment of this invention has the surfaces and parameters set forth in the table below.

TABLE 1

| Surface | Apical radius of curvature (mm) | Shape factor | Index of refraction to next surface | Distance to next surface (mm) |
|---|---|---|---|---|
| Anterior cornea | 7.77 | 0.25 | 1.376 | 0.50 |
| Posterior cornea | 6.40 | 0.60 | 1.336 | 3.16 |
| Anterior crystalline lens | 12.40 | 0.94 | $n_a$ | 1.59 |
| Midplane of lens | infinity | — | $n_p$ | 2.43 |
| Posterior crystalline lens | −8.10 | −0.96 | 1.336 | variable |
| Retina | — | — | — | — |

$n_a = 1.368 + 0.049057\ z - 0.015427\ z^2 - 0.001978\ r^2$
$n_p = 1.407 - 0.006605\ z^2 - 0.001978\ r^2$ where: z is the axial distance from the surface along the optical axis and r is the radial distance from the optical axis The eye model/contact lens system 10 is illustrated in FIG. 1 with a soft contact lens 20 placed on the cornea 22 and centered on the visual axis 15. The surfaces defined in the eye model are the anterior corneal surface 30, the posterior corneal surface 31, the anterior crystalline lens surface 32, the midplane of the crystalline lens 33, the posterior crystalline lens surface 34, and the retina 35. When positioned on the cornea, the soft contact lens conforms to the anterior corneal surface 30. Thus, the posterior contact lens surface is in the same location 30 as the anterior corneal surface. The anterior contact lens surface 36 is the first surface contacted by an incident ray of light for the eye model/contact lens system.

Using this eye model, it has been found that, if one chooses a contact lens having myopic refractive correction, specifies an eye with a normal shape factor and a soft contact lens with spherical surfaces, the asphericity of the cornea is induced on the contact lens and that the resulting shape factor of the anterior contact lens surface is greater than that of the cornea. It is also found that, if the shape of the cornea is kept constant and the refractive correction of the crystalline lens is changed that, as the refraction becomes more hyperopic, there is a need for more correction for spherical aberration. The use of ray tracing allows the magnitude of the effect to be found. In addition, if the refractive correction of the crystalline lens is held constant and the eccentricity of the cornea is changed over the expected human range, it is found that the spherical aberration changes. It is of interest to note that the magnitude of this change is about the same magnitude as the change in spherical aberration found when the eccentricity is held constant and the refractive power of the lens is varied over the expected human range for refractive power. Unexpectedly, this indicates that the individual exterior shape of the contact lens/cornea system is just as important as the refractive correction needed in determining the amount of spherical aberration correction needed.

For the ray tracing in accord with the present invention, the soft contact lens is assumed to be molded to the anterior surface of the cornea such that the posterior contact lens surface conforms to the shape of the anterior corneal surface. Using the technique described by Campbell, C. E. in *J Br. Contact Lens Assoc.* 18:127–28 (1995), the radial thickness of a contact lens with an arbitrary, but well characterized geometrically, front surface and a spherical base curve surface can be calculated at many radial positions from the center of the contact lens to the periphery. It is assumed that, when the lens is placed on the eye, the flexing is not severe so that the thickness does not change significantly at any point. However the anterior contact lens surface does change its shape as the base curve, i.e., posterior contact lens surface, conforms to the anterior corneal surface. Indeed, the anterior contact lens surface moves as the contact lens conforms to the shape of the cornea so as to keep the local thickness of the contact lens the same as it was when the lens was relaxed. This movement of the front surface is assumed to be in the direction of the local surface normal of the cornea.

The result of these calculations is a new set of coordinates for the anterior contact lens surface. To allow these to be used in the ray tracing program, they can be fit to functions that the program can accept or given to the program in the form of surface height data. A general function available in the Zemax program is an even ordered polynomial, the use of which allows quite unusual surfaces to be fit by a mathematical equation. The Zemax program will also accept conic surfaces where one specifies the apical radius of curvature and a conic constant. Routines that fit the set of points or coordinate data to such surfaces and yield the necessary parameters to use in the ray tracing program can be programmed by conventional techniques, if desired. Fitting programs used to calculate the contact lens examples of the present invention illustrated herein have been written using the Matlab programming system. A program preferably allows one to choose (a) an anterior surface of the cornea by specifying an apical radius of curvature and a shape factor (eccentricity squared), (b) a base curve radius of the contact lens, (c) a central lens thickness, (d) a refractive error of the eye and (e) a shape factor of the anterior contact lens surface before it is placed on the eye. An example of a suitable Matlab program for the practice of the present invention is found in Table 4 at the end of this specification.

One problem is that an elliptical cross section can be represented in two different orientations. See FIGS. 2a and 2b. FIG. 2a illustrates the orientation of an ellipse with its prolate apex crossing the center line. FIG. 2b illustrates the orientation of the same ellipse with its oblate apex crossing the center line. However, it is the same ellipse and, therefore, has the same eccentricity, regardless of orientation.

Eccentricity is defined as $e=(1-a^2/b^2)^{0.5}$ where a<b for the ellipse. Thus, eccentricity provides no information about the orientation of the ellipse. The shape factor E and the conic constant K are defined as $E=-K=1-H^2/V^2$. For the prolate orientation (FIG. 2a), $E=e^2$ because a=H and b=V, H<V. Thus, the values of both the shape factor and the eccentricity are positive. However, for oblate orientation, it can be seen that E is negative because now H>V. Thus, for the oblate orientation E is not equal to $e^2$. In this case, the square root of E is not the eccentricity but is, in fact, an imaginary number. For convenience, for the oblate orientation, convention defines the eccentricity as a negative value of the square root of the absolute value of the shape factor (i.e., $e=-|E|^{0.5}$).

The present invention has found that, for contact lenses having minus power, a contact lens can require the curvature of an ellipse in the oblate orientation, i.e., $-1<e<0$, for optimized correction of spherical aberration.

Contact lenses having a corrective power selected from $-10$ D to $+8$ D in 2 D steps were designed in accord with the present invention. Apical radii of curvature of the anterior contact lens surface, when fitted on the eye model, were determined for contact lenses having a preselected center thickness and a corrective power selected from $-10$ D to $+8$ D in 2 D steps. These apical radii of curvature values were then used in the Zemax ray tracing program as the first surface of the eye model/lens system. For each lens corrective power the conic constant (the negative of the shape factor) was varied until the Strehl ratio of the eye as a whole was maximized, i.e., a trace of light ray paths was optimized for sharpest focus by minimizing a retinal spot size of the rays.

The Strehl ratio represents the integral of the modulation transfer function (MTF) of an actual optical system divided by the MTF of a diffraction limited optical system of the same numerical aperture. This integral is taken over a spatial frequency range of 0 cycles per degree to the system cutoff frequency. It has been found that the performance of the human visual system is very well correlated with that which may be called a "truncated" Strehl ratio. The truncated Strehl ratio is found by integrating the MTF of the actual system from 4 cycles per degree to 60 cycles per degree and dividing by the integral of the diffraction limited case over the same range. Thus, for the present invention, the truncated Strehl ratio is also a merit function that can be used to optimize the performance of the contact lens/eye system. Although the truncated Strehl ratio is theoretically superior to the normal Strehl ratio, it is not as readily available in commercial ray tracing programs. Thus, the normal Strehl ratio is typically used as a merit function for optimizing an optical system's performance, as is well known to those skilled in the art. Other merit functions known or constructed by those skilled in the art can also be used to optimize the optical system of the contact lens/eye system in accord with the present invention.

For each optimized contact lens on the eye model, the difference between the anterior surface of the cornea and the anterior contact lens surface was calculated for the preselected center thickness of the lens to obtain a thickness profile for the contact lens as a function of radius from the center of the contact lens.

Next, to construct the shape of the contact lens for manufacturing, first one surface of the contact lens was selected to have a particular spheric or aspheric shape for comfortable fit to the wearer's eye. Preferably, a spherical or an ellipsoidal lens surface is selected for the posterior surface of the lens for convenience and ease of machining. The thickness profile of the lens as a function of radius calculated by ray tracing was then used to calculate the second surface of the contact lens so that the relaxed or unflexed contact lens has the same thickness profile as the calculated contact lens when placed on the cornea.

The thickness profile provides a second surface of the unflexed contact lens that is represented by points that have a calculated distance from the selected posterior contact lens surface as a function of radius. These points can be defined by an equation that is selected by making the best fit of a mathematical curve to the points. The best fit is conveniently performed using a least squares technique for fitting the equation of a curve to a set of points, as is well known to those skilled in the art. Any convenient mathematical curve and curve fitting technique can be used to fit the calculated points. Preferably, a higher ordered polynomial equation is used. However, any equation that can be used to define a surface such as, for example, the equation of an elliptical curve also can be used to fit the set of calculated points.

Examples of contact lenses designed in accord with the present invention are set forth in Table 2. For purposes of illustration of the present invention, contact lenses were designed having the range of corrective powers from −10 D to +8 D in 2 D steps. The center thickness for each lens was set as listed in Table 2. The posterior surface for the contact lens was set to be a spherical surface having a radius of curvature of 8.6 mm. The above described eye model was constructed in the Zemax program using the values set forth in Table 1. Assuming that the posterior surface of the contact lens matches exactly the anterior surface of the cornea when the contact lens is fit on the eye, the apical curvature of the anterior surface of the lens was determined for each corrective power and predetermined center thickness so that, when the contact lens is placed on the eye, the desired corrective power is attained. Next, for each contact lens, the aspheric constants of the Zemax program for the anterior surface of the contact lens were varied (essentially varying the shape factor or eccentricity) until the Strehl ratio for the contact lens/eye model system was maximized. A change in the value of the shape factor of about 0.02 has been found to provide a noticeable change in the Strehl ratio. A deviation in the value of the shape factor of about 0.08 from the optimum value has been found to cause the Strehl ratio to fall below 0.80, which is considered to be a point at which noticeable loss is found.

Using the MatLab program set forth in Table 4, a shape factor was selected for the anterior surface of the contact lens in its unflexed state (as manufactured, i.e., not applied to the cornea). Using this anterior surface and the predetermined posterior surface and center thickness, the thickness profile of the contact lens was calculated, i.e., thickness values were calculated as a function of radius from the center of the contact lens. These calculated thickness values were added to the anterior surface of the cornea in the eye model to construct the anterior surface of the flexed contact lens when fitted to the eye. This constructed anterior contact lens surface was represented by a set of coordinates for that surface. The coordinates for the constructed anterior contact lens surface were fit to a conic section using a least squares curve fitting technique. Thus, the shape factor of the constructed, flexed anterior contact lens surface was determined.

Then, this shape factor of the constructed, flexed anterior contact lens surface was compared to the shape factor of the anterior contact lens surface optimized in the Zemax program. If the constructed, flexed anterior contact lens surface did not match the shape factor of the anterior contact lens surface optimized in the Zemax program within an acceptable accuracy, then the shape factor for the unflexed anterior contact lens surface was adjusted and entered into the MatLab program for calculations and comparison. This procedure was reiterated until an acceptable accuracy was obtained when comparing the constructed, flexed anterior contact lens surface to the shape factor of the anterior contact lens surface optimized in the Zemax program (e.g., the comparison between iterations did not substantially change). When the comparison attained the desired accuracy, the constructed contact lens having the selected posterior surface and the anterior surface for the unflexed lens as entered into the MatLab program provides optimum performance when placed on the eye. The preferred accuracy results in a shape factor comparison having a difference in value between (i) the shape factor of the constructed, flexed anterior contact lens surface and (ii) the shape factor of the anterior contact lens surface optimized in the Zemax program less than or equal to about 0.08, more preferably less than or equal to about 0.02.

Then, the optimized shape factor for the unflexed contact lens was converted to an eccentricity to give the values found in Table 2. Although the eccentricity of a conic section can never take a negative value, the convention used in the contact lens industry of assigning a negative value to the eccentricity when an oblate orientation is desired has been used here.

Thus, for the contact lenses in Table 2, the posterior surface of each lens was selected to be a spherical surface having an apical radius of curvature of 8.6 mm and the diameter of the optical correction zone of the lens is 8 mm.

TABLE 2

| Lens No. | Corrective power (D) | Apical radius of curvature (mm) | Eccentricity | Center thickness (mm) |
| --- | --- | --- | --- | --- |
| 1 | −10 | 10.75 | −.59 | 0.10 |
| 2 | −8 | 10.25 | −.51 | 0.10 |
| 3 | −6 | 9.80 | −.42 | 0.125 |
| 4 | −4 | 9.38 | −.29 | 0.15 |
| 5 | −2 | 9.01 | .12 | 0.175 |
| 6 | 0 | 8.66 | .32 | 0.20 |
| 7 | 2 | 8.34 | .41 | 0.225 |
| 8 | 4 | 8.05 | .47 | 0.25 |
| 9 | 6 | 7.77 | .51 | 0.275 |
| 10 | 8 | 7.52 | .52 | 0.30 |

To manufacture a contact lens having the optimized calculated thickness profile, the selected first contact lens surface and calculated second contact lens surface are molded by conventional cast molding techniques or are machined onto the lens blank by conventional numerically controlled machines, by methods that are well known to those skilled in the art.

Contact lenses were also constructed using a direct solve method for determining the shape of the contact lens for manufacturing based on the optimized lens from the Zemax program. The contact lenses designed by this direct solve method for determining the shape of the second surface of the unflexed contact lens are set forth in Table 3 wherein, as for the contact lenses set forth in Table 2, the posterior surface of each lens was selected to be a spherical surface having an apical radius of curvature of 8.6 mm and the diameter of the optical correction zone of the lens is 8 mm. The MatLab program used for this direct solve method is listed in Table below.

TABLE 3

| Lens No. | Corrective power (D) | Apical radius of curvature (mm) | Eccentricity | Center thickness (mm) |
| --- | --- | --- | --- | --- |
| 1 | −10 | 10.73 | −.56 | 0.10 |
| 2 | −8 | 10.24 | −.49 | 0.10 |
| 3 | −6 | 9.79 | −.39 | 0.12 |
| 4 | −4 | 9.38 | −.26 | 0.15 |
| 5 | −2 | 9.00 | .16 | 0.17 |
| 6 | 0 | 8.66 | .33 | 0.20 |
| 7 | 2 | 8.34 | .42 | 0.23 |
| 8 | 4 | 8.05 | .47 | 0.25 |
| 9 | 6 | 7.78 | .51 | 0.28 |
| 10 | 8 | 7.51 | .53 | 0.30 |

A comparison between the values set forth in Tables 2 and 3 shows little difference between the contact lenses designed by these two ways of practicing the present invention.

At present, there is no way of determining the correction for spherical aberration supplied by the crystalline lens on an individual basis so the variation of this important factor is unknown. Also, there is no way to determine easily the amount of spherical aberration correction needed for an individual directly. Thus, in preferred embodiments of the present invention, the corneal shape and refractive error are determined, an average correction by the crystalline lens is provided for the eye model and the spherical aberration correction needed is calculated. Preferably, calculations are made for a contact lens that is correcting for a distant object. Should it be desired to calculate for a contact lens for reading performance, the optical design will slightly change because the vergence of light entering the eye will be different and will call for more correction for spherical aberration. However, the method for calculating the contact lens profile will be exactly the same.

The methods of the present invention also can be used to design and manufacture multi-focal contact lenses. In such case, the thickness profile of each zone of a multi-focal lens can be optimized to minimize spherical aberration caused by the power correction in that zone. For example, if a multi-focal lens has a center near vision correction zone and an outer distance vision correction zone circumscribing the near vision correction zone, the anterior contact lens surface of each zone, when placed on the cornea, can be optimized for correction of spherical aberration using the methods of the present invention.

A particularly useful multi-focal lens is described in copending application Ser. No. 08/716,199 filed Sep. 27, 1996, the disclosure of which is hereby incorporated by reference. That application describes multi-focal lens that is particularly useful for correcting presbyopia. That multi-focal lens includes a central circular zone that is overcorrected for near vision based on the prescribed correction required by the user, an outer zone circumscribing the central zone and having distance vision correction for the user, and a plurality of concentric transition zones each circumscribing the central zone and located between the central zone and the outer zone. Preferably, one or more of the zones of the multi-focal contact lens are corrected for spherical aberration using the method of the present invention as described above.

In one preferred embodiment, the multi-focal lens has at least the outer distance vision correction zone corrected for spherical aberration. To do so in accord with the present invention, the multi-focal lens is positioned on the eye model and ray tracing is performed on the distance vision correction zone and a trace of light ray paths is optimized for sharpest focus by minimizing a retinal spot size of the rays by varying the shape factor of the anterior contact lens surface for that zone in accord with the present invention. The calculated thickness profile for the distance vision correction zone is then used to design and manufacture the multi-focal lens.

Thus, a method for constructing a multi-focal soft contact lens having a center circular zone for a first prescribed vision correction and an outer zone circumscribing the center zone for a second prescribed vision correction, one of the zones having a prescribed distance vision correction for focusing light on the retina of an eye comprises at least the steps of:

constructing an eye model including a cornea, a crystalline lens and a retina;

selecting a shape for an anterior surface of the cornea to be a conic section having an eccentricity in the range of about 0.14<e<0.63;

selecting a preliminary soft contact lens having a center thickness, a radius, a posterior contact lens surface and an anterior contact lens surface to provide a prescribed distance vision correction power in one of the zones such that, when applied to the anterior surface of the cornea, the anterior contact lens surface in a region of the distance vision correction power zone defines a conic section having a shape factor in the range of 0<E<1 or −1<E<0;

performing an analysis using the preliminary soft contact lens and eye model tracing light ray paths through the contact lens/eye system in zone having distance vision correction power;

varying the shape factor of the anterior contact lens surface in the zone having distance vision correction power when applied to the anterior surface of the cornea to achieve an contact lens/eye system wherein a trace of light ray paths is optimized for the zone having distance vision correction power for sharpest focus by minimizing a retinal spot size of the rays, the shape factor being varied within the range of 0<E<1 or −1<E<0, thereby defining an optimized anterior contact lens surface for the zone having distance vision correction power for the soft contact lens when applied to the anterior surface of the cornea;

calculating a thickness profile for the zone having far distance correction power for the optimum contact lens using the differences in distance between the anterior surface of the cornea and the optimized anterior contact lens surface at various values of the contact lens radius from the center of the contact lens for the zone having far distance correction power; and determining a shape for manufacture of said soft contact lens by selecting a first surface for said soft contact lens and calculating a second surface for said soft contact lens using said first surface and said thickness profile for the zone having far distance correction power.

The method can further comprise one or more of the following steps:

selecting the shape of a first surface of a relaxed contact lens;

calculating a set of points defining for the zone having distance vision correction power of a second surface of said relaxed contact lens using said thickness profile; and making a contact lens having said first and second surfaces.

Thus, a multi-focal soft contact lens having a center circular zone for a first prescribed vision correction and an outer zone circumscribing the center zone for a second prescribed vision correction, one of the zones having a prescribed distance vision correction for focusing light on the retina of an eye and having aberration correction is constructed.

Thus, it can be appreciated that the methods of the present invention can be used to provide optimized correction of spherical aberration in mono-focal and multi-focal soft contact lenses.

The present invention has been described in detail including the preferred embodiments of the invention. However, it will be appreciated that, upon consideration of the present disclosure, those skilled in the art may make modifications and improvements within the spirit and scope of the present invention as defined by the appended claims. For example, an ophthalmic (cataract replacement) lens can be used in the eye model in place of the crystalline ("natural eye") lens. The anterior contact lens surface may be selected and the posterior contact lens surface calculated based on the optimized thickness profile provided by ray tracing. Any of the conic parameters or aspheric parameters can be varied in optimizing the design of the contact lens because they are related. Also, the calculated points may be fit by any of a variety of mathematical techniques for fitting the best curve to a set of points. Further, non-conic equations can be used to fit the calculated points to give a possible greater accuracy to the constructed surface and possibly a more optimized correction for aberration.

TABLE 4

MATLAB code

```
%   This routine will calculate the radial thickness of a specified
%   series of contact lenses at various radial positions for given anterior surface
%   apical curvature, shape factor, central thickness, posterior surface curvature.
%   curvature. The lens series is specified by refractive power.
%   The lens posterior surface is taken to be spherical.
%   The calculated thickness is added to a corneal
%   anterior surface and a new anterior surface for the lens is generated.
%   This new anterior surface is described in terms of even polynomial coefficients (for use in
%   ZEMAX) and in terms of an apical radius of curvature and an eccentricity.
%   INPUT DATA
P=(-10:2:8);    %   lens power (central)
t=[.1 .1 .125 .15 .175 .2 .225 .25 .275 .3];     %   central lens thickness chosen
                                                 %   for the various selected powers
rbc=8.6;        %   base curve radius of curvature of the contact lens
sa=[-.53 -.35 -.22 -.1 .05 .1 .14 .22 .26 .28];  %   anterior shape factor of unflexed
                %   contact lens. These are manually inserted as input data
                %   and changed until the values calculated for g1, g2, g3 and g4 closely match
                %   those found from ray tracing which minimize the spherical aberration
rac=7.77;       %   anterior apical radius of curvature of the cornea
sc=.25          %   shape factor of the cornea
n=1.435;        %   index of refraction of the contact lens
%   This step smooths the manually entered factor values using a cubic polynomial
%   fit where shape factor is fit as a function of lens power
G=polyfit(P,sa,3);
sal=polyval(G,P);  %   fitted shape factors
x1=[0:.1:5.4];  %   radial position of anterior surface point on the lens
ra1=t*(n-1)./n+1./(P./1000(n-1)+1/rbc);  %   anterior radius of curvature of the lens
pal=1-sal;      %   aspheric constant of the flexed contact lens anterior surface
pc=1-sc;        %   aspheric constant of the cornea
R=ones(size(x1,2),1)*ra1;
X=x1'*ones(1,size(ra1,2));
p=ones(size(x1,2),1)*pal;
T=ones(size(x1,2),1)*t;
Y=R./p-((R./p).^2-X.^2./p).^.5;  %   axial position on anterior surface of contact lens
ya=-Y+rbc+T;    %   axial position on anterior surface transformed to posterior surface
                %   coordinate center
d-(ya.^2+X.^2).^.5-rbc;   %   lens thickness at chosen points
x=rbc*X./(d+rbc);  %   radial position on posterior lens surface of points
yc=rac/pc*(-(1-pc*(x./rac).^2).^.5);   %   axial position on anterior corneal surface
dydx=x./(rac-pc*yc);  %   corneal slope at radial points
yn1=yc-d./(1+dydx.^2).^.5+T;  %   new anterior contact lens surface axial position
xn1=x+d.*dydx./(1+dydx.^2).^.5;  %   new anterior contact lens surface radial position
yy=yn1;
yy(1,:)=[ ];
xx=xn1;
xx(1,:)=[ ];
Yn=[flipud(yn1); yy];
Xn=[-flipud(xn1); xx];
%   fit to conic section using my special method of least squares fit
%   to a general conic:
%       1=Ax^2+By^2+Cxy+Dx+Ey
for i=1:size(ra1,2)
F=[Xn(:,i).^2 Yn(:,i).^2 Xn(:,i).*Yn(:,i) Xn(:,i) Yn(:,i)];  %   create position function matrix
%   Solve least squares problem
y=ones(length(Xn(:,i)),1);
[Q,R]=qr(F,0);
p=R\(Q'*y);     %   Same as p=F\y;
r=y-F*p;
C=p.';          %   Polynomial coefficients are row vectors by convention.
C1=[C(4); C(5)];
Cq=[C(1) C(3)/2;C(3)/2 C(2)];
po=2*Cq\Cl;
M=Cq/(1+po'*Cq*po);
[V,D]=eig(M);
m(i)=sqrt(D(2,2))/D(1,1);  %   fitted apical curvature
E(i)=1-D(2,2)/D(1,1);  %   effective shape factor (shape factor of anterior lens surface
                %   when on the lens is on the eye)
c(i,:)=C;
end
L=[P' E' rn'sal']  %   matrix of lens powers effective shape factors
                %   apical curvatures and shape factors for anterior surface
                %   of the unflexed lens
XXL=X;
XXL(1,:)=[ ];
XX=[flipud(X); XXL];
for i=1:size(Xn,2)
S=polylens(Xn(:,i),Yn(:,i),4);
z=polyeven(S,XX(:,i));
```

TABLE 4-continued

```
Z=Y(:,i);
zz=flipud(Z);
Z(1,:)=[ ];
delta=z-[zz; Z];
delta=delta-delta(55);
g1(i)=S(4);
g2(i)=S(3);
g3(i)=S(2);
g4(i)=S(1);
end
G=[P' g1' g2' g3' g4']  %   coefficients of even polynomial at various powers
%    specialized fit to a conic section when the section is centered with the apex
%    at x=y=0
for i=1:size(Xn,2)
x2=Xn(:,i).^2;
y2=[Yn(:,i) Yn(:,i)^2];
c2=y2\x2;
E2(i)=1+c2(2);
R2(i)=c2(1)/2;
end
ER=[P' E2' R2'sa1']   %   matrix of lens power, shape factor of fitted lens, apical radius of
                      %   curvature of fitted lens, shape factor of unflexed lens
%   conversion of lens unflexed shape factors to eccentricities
F=polyfit(P,sa,2);
saf=polyval(F,P);
for i=1:size(P,2)
    if saf(i)>0
        e(i)=sqrt(saf(i));
    else
        e(i)=-sqrt(-saf(i)/(1-saf(i)));
    end
end
PP=[P',ra1',e']  %   matrix of lens power, lens apical radius of curvature and eccentricity
figure(1)
plot(P,e,'g',P,zeros(size(P,2),1))
function [p,S]=polylens(x,y,n)
%POLYLENS Fit polynomial to data.
%    POLYLENS(X,Y,N) finds the coefficients of an even polynomial P(X) of
%    n terms that fits the data, P(X(I))~=Y(I), in a least-squares sense.
%        It is designed to be used with modern lens ray tracing programs,
%        such as ZEMAX, which allow surfaces to be specified as even order
%        polynomials.
%
%    [P,S]=POLYLENS(X,Y,N) returns the polynomial coefficients P and a
%    structure S for use with POLYEVEN to obtain error estimates on
%    predictions. If the errors in the data, Y, are independent normal
%    with constant variance, POLYEVEN will produce error bounds which
%    contain at least 50% of the predictions.
%
%    also see POLYEVEN
%
%    The regression problem is formulated in matrix format as:
%
%    y=V*p or
%
%    y=[x^6 x^4 x^2 1] [p3
%                       p2
%                       p1
%                       p0]
%
%    where the vector p contains the coefficients to be found. For a
%    7th order even polynomial, matrix V would be:
%
%    V=[x.^14 x.^12 x.^10 x.^8 x.^6 x.^4 x.^2 ones(size(x))];
if ~is equal(size(x),size(y))
    error('X and Y vectors must be the same size.')
end
x=x(:);
y=y(:);
% Construct Vandermonde matrix.
V(:,n+1)=ones(length(x),1);
for j=n:-1:1
    V(:,j)=x.^2.*V(:,j+1);
end
% Solve least squares problem, and save the Cholesky factor.
[Q,R]=qr(V,0);
p=R\(Q'*y);   % Same as p=V\y;
r=y-V*p;
p=p.';     % Polynomial coefficients are row vectors by convention.
```

TABLE 4-continued

```
% S is a structure containing three elements: the Cholesky factor of the
% Vandermonde matrix, the degrees of freedom and the norm of the residuals.
S.R=R
S.df=length(y)-(n+1);
S.normr=norm(r);
function [y, delta]=polyeven(p,x,S)
%POLYEVEN Evaluate polynomial.
%   Y=POLYEVEN(P,X), when P is a vector of length N+1 whose elements
%   are the coefficients of an even polynomial, is the value of the
%   polynomial evaluated at X.
%
%       Y=P(1)*X^2N+P(2)*X^2(N-1)+ . . . +(P(N)*X^2+P(N+1)
%
%   If X is a matrix or vector, the polynomial is evaluated at all
%   points in X.
%
%   [Y,DELTA]=POLYEVEN(P,X,S) uses the optional output structure
%   generated by POLYLENS to generate error estimates, Y +/- delta.
%   If the errors in the data input to POLYFIT are independent normal
%   with constant variance, Y +/- DELTA contains at least 50% of the
%   predictions.
%   Polynomial evaluation p(x) using Horner's method
[m,n]=size(x);
nc=length(p);
infs=find(isinf(x));
sinfs=(sign(x(infs)).^(length(p))).*x(infs);
if ((m+n)==2) & (nargin<3)
    % Fast routine for scalar x. Polynomial evaluation can be
    % implemented as a recursive digital filter.
    y=filter(1,[1-x],p);
    y=y(nc);
    return
end
% Do general case where X is an array
y=zeros(m,n);
for i=1:nc
    y=x.^2.*y+p(i);
end
if nargin>2 & nargout>1
    x=x(:);
    % Extract parameters from S
    f isstruct(S), % Use output structure from polylens.
    R=S.R;
    df=S.df;
    normr=S.normr;
else    % Use output matrix from previous versions of polyfit.
    [ms,ns]=size(S);
    if(ms~=ns+2)|(nc~=ns)
        error('S matrix must be n+2-by-n where n=length(p)')
    end
    R=S(1:nc,1:nc);
    df=S(nc+1,1);
    normr=S(nc+2,1);
end
% Constrict Vandermonde matrix.
V(:,nc)=ones(length(x),1);
for j=nc-1:-1:1
    V(:,j)=x.^2.*V(:,j+1);
end
% S is a structure containing three elements: the Cholesky factor of the
% Vandermonde matrix, the degrees of freedom and the norm of the residuals.
E=V/R;
if nc==1
    e=sqrt(1+(E.*E));
else
    e=sqrt(1+sum((E.*E)')');
end
    if df==0
        disp('Warning: zero degrees of freedom implies infinite error bounds.')
        delta=repmat(Inf,size(e));
    else
        delta=norm/sqrt(df)*e;
    end
    delta=reshape(delta,m,n):
end
y(infs)=sinfs;
```

TABLE 5

```
MATLAB code
%    This routine will calculate the shape factor and apical radius of curvature of the
%    of the anterior surface of an unflexed soft contact lens
%    when the shape factor and and apical radius of curvature
%    of the flexed lens on the eye is given. Other input values are the
%    center thickness of the lens and the base curve radius of curvature of the
%    unflexed lens. This calculation is done for various lens powers.
%    INPUT DATA
power=(-10:2:8);%  lens power(central)
t=[.1 .1 .125 .15 .175 .2 .225 .25 .275 .3];      %   central lens thickness chosen
                                                  %   for the various selected powers
rbc=8.6;          %   base curve radius of curvature of the unflexed contact lens
sal=[0 .1 .18 .22 .28 .32 .36 .39 .41 .43];   %   anterior shape factors of the
                  %   flexed contact lens which give the best correction of aberration as
                  %   found from optimizing the Strehl ratio of the lens/eye system
rac=7.77;         %   anterior apical radius of curvature of the cornea
ra1=[9.53 9.13 8.77 8.44 8.13 7.85 7.59 7.35 7.12 6.9];   %   anterior apical radius of
curvature of the flexed lens
sc=.25;           %   shape factor of the cornea
n=1.435;          %   index of refraction of the contact lens
%    FIND RADIAL THICKNESS OF THE FLEXED LENS AT SELECTED RADIAL
LOCATIONS
x1=[0.001:.1:5.4];  %   radial position of anterior surface point on the lenS
pal=1-sal;        %   aspheric constant of the flexed contact lens anterior surface
pc=1-sc;          %   aspheric constant of the cornea
R=ones(size(x1,2),1)*ones(size(ra1,2),1)'*rac;
RR=ones(size(x1,2),1)*ones(size(ra1,2),1)'*ra1;
X=x|'*ones(1.size(ral,2)):
p=ones(size(x1,2),1)*ones(size(ra1,2),1)'*pc;
P=ones(size(x1,2),1)*pal;
T=ones(size(x1,2),1)*t;
Y=R./p-((R./p).^2-X.^2./p).^.5;   %   azial position on posterior surface of contact lens
m=(P.*Y-R)./X;    %   slope of normal at each posterior position selected
ya=Y+T:           %   axial position on posterior surface transformed to anterior surface
                  %   coordinate center
A=1+P.*m.^2;
B=m.*(RR-ya.*P+m.*X.*P);
C=(m.*X-ya).*(2*RR+P.*(m.*X-ya));
xa=(B+sqrt(B.^2-A.*C))./A;        %   radial position on anterior surface
d=((xa-X).^2.*(1+m.^2)).^.5       ;%   normal lens thickness at selected positions
s=1;
plot(X(:,s),ya(:,s),'bo-',xa(:,s),(xa(:,s)-X(:,s)).*m(:,s)+ya(:,s),'ro-')
axis equal
%    FIND POSITIONS ON ANTERIOR SURFACE OF UNFLEXED LENS
RB=ones(size(x1,2),1)*ones(size(ra1,2),1)'*rbc;
Y1=RB-(RB.^2-X.^2).^.5;   %   axial position on anterior surface of contact lens
ya1=Y1+T;         %   axial position on anterior surface transformed posterior surface
                  %   coordinate center
M=(Y1-R)./X;      %   slope of normal at each posterior position selected
xp=d./sqrt(1+M.^2)+X;
yp=-d./sqrt(1+1./M.^2)+ya1;
yy=yp;
yy(1,:)=[ ];
xx=xp;
xx(1,:)=[ ];
Yn=[flipud(yp); yy];    %   create a full meridian of y data
Xn=[-flipud(xp); xx];   %   create a full meridian of x data
%    FIT ANTERIOR LENS SURFACE JUST FOUND TO TO A GENERAL CONIC
%    USING THE METHOD OF LEAST SQUARES:
%
%       1=Ax²+By²+Cxy+Dx+Ey
for i=1:size(ra1.2)
F=[Xn(:,i).^2 Yn(:,i).^2 Xn(:,i).*Yn(:,i) Xn(:,i) Yn(:,i)];  %  create position function matrix
%  SOLVE LEAST SQUARES PROBLEM
y=ones(length(Xn(:,i)),1);
[Q,R]=qr((F,0);
p=R\(Q'*y):     %  Same as p=F\y;
r=y-F*p:
C=p.';          %  Polynomial coefficients are row vectors by convention.
C1=[C(4); C(5)];
Cq=[C(1) C(3)/2;C(3)/2 C(2)];
po=2*Cq\C1;
M=Cq/(1+po'*Cq*po):
[V,D]=eig(M);
rn(i)=sqrt(D(2,2))/D(1,1):  %  fitted apical curvature anterior surface of the unflexed lens
E(i)=1-D(2,2)/D(1,1);%    shape factor of anterior unflexed lens surface
c(i,:)=C;
end
format bank
```

TABLE 5-continued

```
K=[power' E' rn'sal']%    matrix of lens powers, shape factors for
                          %  anterior surface of the unflexed lens apical
                          %  radii of curvature for the unflexed lens,
                          %  shape factor of anterior surface of the lens on
the eye
%  CONVERSION OF LENS UNFLEXED SHAPE FACTORS TO ECCENTRICITIES
F=polyfit(power,E,2);
saf=polyval(F,power);
for i=1:size(power,2)
    if saf(i)>0
        e(i)=sqrt(saf(i));
    else
        e(i)=-sqrt(-saf(i)/(1-saf(i)));
    end
end
PP=[power',rn',e't'] % matrix of lens power, lens apical radius of curvature
                     % eccentricity and center thickness of unflexed lens
```

What is claimed is:

1. A method for constructing a soft contact lens having a prescribed power correction for focusing light on the retina of an eye, said method comprising:

constructing an eye model including a cornea, a crystalline lens and a retina;

selecting a shape for an anterior surface of the cornea to be a conic section having an eccentricity in the range of about 0.14<e<0.63;

selecting a preliminary soft contact lens having a center thickness, a radius, a posterior contact lens surface and an anterior contact lens surface to provide a prescribed plus or minus correction power such that, when applied to the anterior surface of the cornea, the anterior contact lens surface defining a conic section having a shape factor in the range of 0<E<1 or −1<E<0;

performing an analysis using the preliminary soft contact lens and eye model tracing light ray paths through the contact lens/eye system;

varying the shape factor of the anterior contact lens surface when applied to the anterior surface of the cornea to achieve an contact lens/eye system wherein a trace of light ray paths is optimized for sharpest focus by minimizing a retinal spot size of the rays, the shape factor being varied within the range of 0<E<1 or −1<E<0, thereby defining an optimized anterior contact lens surface for the soft contact lens when applied to the anterior surface of the cornea;

calculating a thickness profile for the optimum contact lens using the differences in distance between the anterior surface of the cornea and the optimized anterior contact lens surface at various values of the contact lens radius from the center of the contact lens; and determining a shape for manufacture of said soft contact lens by selecting a first surface for said soft contact lens and calculating a second surface for said soft contact lens using said first surface and said thickness profile.

2. The method for constructing a soft contact lens in accord with claim 1, wherein the prescribed correction power is from −20 D to +20 D.

3. The method for constructing a soft contact lens in accord with claim 1, wherein the center thickness of the contact lens is in the range of about 0.02 mm to about 1.0 mm.

4. The method for constructing a soft contact lens in accord with claim 1, wherein the anterior surface of the cornea of the eye model has an eccentricity in the range of about 0.35 to about 0.60.

5. The method for constructing a soft contact lens in accord with claim 1, wherein the center thickness of the contact lens is in the range of about 0.1 mm to about 0.6 mm.

6. The method for constructing a soft contact lens in accord with claim 1, wherein the anterior surface of the cornea of the eye models has an eccentricity in the range of about 0.45 to about 0.55.

7. The method for constructing a soft contact lens in accord with claim 1, said method further comprising:

selecting the shape of a first surface of a relaxed contact lens; and calculating a set of points defining a second surface of said relaxed contact lens using said thickness profile.

8. The method for constructing a soft contact lens in accord with claim 7, wherein said first surface is selected to be a spherical surface.

9. The method for constructing a soft contact lens in accord with claim 7, wherein said first surface is selected to be an ellipsoidal surface.

10. The method for constructing a soft contact lens in accord with claim 7, said method further comprising machining onto a contact lens blank said first and second surfaces.

11. The method for constructing a soft contact lens in accord with claim 7, said method further comprising molding a contact lens having said first and second surfaces.

12. A method for constructing a multi-focal soft contact lens having a center circular zone for a first prescribed vision correction and an outer zone circumscribing the center zone for a second prescribed vision correction, one of the zones having a prescribed far distance vision correction for focusing light on the retina of an eye, said method comprising:

constructing an eye model including a cornea, a crystalline lens and a retina;

selecting a shape for an anterior surface of the cornea to be a conic section having an eccentricity in the range of about 0.14<e<0.63;

selecting a preliminary soft contact lens having a center thickness, a radius, a posterior contact lens surface and an anterior contact lens surface to provide a prescribed distance vision correction power in one of the zones such that, when applied to the anterior surface of the cornea, the anterior contact lens surface in a region of the distance vision correction power zone defines a conic section having a shape factor in the range of 0<E<1 or −1<E<0;

performing an analysis using the preliminary soft contact lens and eye model tracing light ray paths through the contact lens/eye system in zone having distance vision correction power;

varying the shape factor of the anterior contact lens surface in the zone having distance vision correction power when applied to the anterior surface of the cornea to achieve an contact lens/eye system wherein a trace of light ray paths is optimized for the zone having distance vision correction power for sharpest focus by minimizing a retinal spot size of the rays, the shape factor being varied within the range of 0<E<1 or −1<E<0, thereby defining an optimized anterior contact lens surface for the zone having distance vision correction power for the soft contact lens when applied to the anterior surface of the cornea;

calculating a thickness profile for the zone having distance vision correction power for the optimum contact lens using the differences in distance between the anterior surface of the cornea and the optimized anterior contact lens surface at various values of the contact lens radius from the center of the contact lens for the zone having distance vision correction power; and determining a shape for manufacture of said soft contact lens by selecting a first surface for said soft contact lens and calculating a second surface for said soft contact lens using said first surface and said thickness profile for the zone having distance vision correction power.

13. The method for constructing a multi-focal soft contact lens in accord with claim 12, said method further comprising:

selecting the shape of a first surface of a relaxed contact lens; and calculating a set of points defining for the zone having distance vision correction power of a second surface of said relaxed contact lens using said thickness profile.

14. The method for constructing a multi-focal soft contact lens in accord with claim 13, wherein said first surface is selected to be a spherical surface.

15. The method for constructing a multi-focal soft contact lens in accord with claim 13, wherein said first surface is selected to be an ellipsoidal surface.

16. The method for constructing a multi-focal soft contact lens in accord with claim 13, said method further comprising machining onto a contact lens blank said first and second surfaces.

17. The method for constructing a multi-focal soft contact lens in accord with claim 13, said method further comprising molding a contact lens having, said first and second surfaces.

18. A soft contact lens having a prescribed power correction for focusing light on the retina of an eye and having aberration correction, said contact lens being constructed by a method including the steps of:

constructing an eye model including a cornea, a crystalline lens and a retina;

selecting a shape for an anterior surface of the cornea to be a conic section having an eccentricity in the range of about 0.14<e<0.63;

selecting a preliminary soft contact lens having a center thickness, a radius, a posterior contact lens surface and an anterior contact lens surface to provide a prescribed plus or minus correction power such that, when applied to the anterior surface of the cornea, the anterior contact lens surface defining a conic section having a shape factor in the range of 0<E <1 or −1<E<0;

performing an analysis using the preliminary soft contact lens and eye model tracing light ray paths through the contact lens/eye system;

varying the shape factor of the anterior contact lens surface when applied to the anterior surface of the cornea to achieve an contact lens/eye system wherein a trace of light ray paths is optimized for sharpest focus by minimizing a retinal spot size of the rays, the shape factor being varied within the range of 0<E<1 or −1<E<0, thereby defining an optimized anterior contact lens surface for the soft contact lens when applied to the anterior surface of the cornea; and calculating a thickness profile for the optimum contact lens using the differences in distance between the anterior surface of the cornea and the optimized anterior contact lens surface at various values of the contact lens radius from the center of the contact lens.

19. The soft contact lens in accord with claim 18, wherein the prescribed correction power is from −20 D to +20 D.

20. The soft contact lens in accord with claim 18, wherein the center thickness of the contact lens is in the range of about 0.02 mm to about 1.0 mm.

21. The soft contact lens in accord with claim 18, wherein the anterior surface of the cornea of the eye model has an eccentricity in the range of about 0.35 to about 0.60.

22. The soft contact lens in accord with claim 18, wherein the center thickness of the contact lens is in the range of about 0.1 mm to about 0.6 mm.

23. The soft contact lens in ac co rd with claim 18, wherein the anterior surface of the cornea of the eye model has an eccentricity in the range of about 0.45 to about 0.55.

24. The soft contact lens in accord with claim 18, wherein said method further comprises the steps of:

selecting the shape of a first surface of a relaxed contact lens; and calculating a set of points defining a second surface of said relaxed contact lens using said thickness profile.

25. The soft contact lens in accord with claim 24, wherein said first surface is selected to be a spherical surface.

26. The soft contact lens in accord with claim 24, wherein said first surface is s elected to be an ellipsoidal surface.

27. The soft contact lens in accord with claim 24, wherein said method further comprising machining onto a contact lens blank said first and second surfaces.

28. The soft contact lens in accord with claim 24, wherein said method further comprising molding a contact lens having said first and second surfaces.

29. A multi-focal soft contact lens having a center circular zone for a first prescribed vision correction and an outer zone circumscribing the center zone for a second prescribed vision correction, one of the zones having a prescribed distance vision correction power for focusing light on the retina of an eye and having aberration correction, said contact lens being constructed by a method including the steps of:

constructing an eye model including a corneal a crystalline lens and a retina;

selecting a shape for an anterior surface of the cornea to be a conic section having an eccentricity in the range of about 0.14<e<0.63;

selecting a preliminary soft contact lens having a center thickness, a radius, a posterior contact lens surface and an anterior contact lens surface to provide a bed distance vision correction power in one of the zones such that, when applied to the anterior surface of the cornea, the anterior contact lens surface in a region of the distance vision correction power zone defines a conic section having a shape factor in the range of 0<E<1 or −1<E<0;

performing an analysis using the preliminary soft contact lens and eye model tracing light ray paths through the contact lens/eye system in zone having distance vision correction power;

varying the shape factor of the anterior contact lens surface in the zone having distance vision correction power when applied to the anterior surface of the cornea to achieve an contact lens/eye system wherein a trace of light ray paths is optimized for the zone having distance vision correction power for sharpest focus by minimizing a retinal spot size of the rays, the shape factor being varied within the range of 0<E<1 or −1<E<0, thereby defining an optimized anterior contact lens surface for the zone having distance vision correction power for the soft contact lens when applied to the anterior surface of t h e cornea; and calculating a thickness profile for the zone having distance vision correction power for the optimum contact lens using the differences in distance between the anterior surface of the cornea and the optimized anterior contact lens surface at various values of the contact lens radius from the center of the contact lens for the zone having distance vision correction power.

30. The multi-focal soft contact lens in accord with claim 29, said method further comprising:

selecting the shape of a first surface of a relaxed contact lens; and calculating a set of points defining for the zone having far distance correction power of a second surface of said relaxed contact lens using said thickness profile.

31. The multi-focal soft contact lens in accord with claim 30, w herein said first surface is selected to be a spherical surface.

32. The multi-focal soft contact lens in accord with claim 30, wherein said first surface is selected to be an ellipsoidal surface.

33. The multi-focal soft contact lens in accord with claim 30, said method further comprising machining onto a contact lens blank said first and second surfaces.

34. The multi-focal soft contact lens in accord with claim 30, said method further comprising molding a contact lens having said first and second surfaces.

35. A soft contact lens comprising the structural characteristics of a lens selected from the group consisting of the following contact lenses wherein the anterior surface of the contact lens has an apical radius of curvature and eccentricity defined in the table below and the posterior surface of the contact lens is a spherical surface having an apical radius of curvature of 8.6 mm:

| Lens No. | Corrective power (D) | Apical radius of curvature (mm) | Eccentricity | Center thickness (mm) |
| --- | --- | --- | --- | --- |
| 1 | −10 | 10.75 | −.59 | 0.10 |
| 2 | −8 | 10.25 | −.51 | 0.10 |
| 3 | −6 | 9.80 | −.42 | 0.125 |
| 4 | −4 | 9.38 | −.29 | 0.15 |
| 5 | −2 | 9.01 | .12 | 0.175 |
| 6 | 0 | 8.66 | .32 | 0.20 |
| 7 | 2 | 8.34 | .41 | 0.225 |
| 8 | 4 | 8.05 | .47 | 0.25 |
| 9 | 6 | 7.77 | .51 | 0.275 |
| 10 | 8 | 7.52 | .52 | 0.30 |

36. A soft contact lens comprising the structural characteristics of a lens selected from the group consisting of the following contact lenses wherein the anterior surface of the contact lens has an apical radius of curvature and eccentricity defined in the table below and the posterior surface of the contact lens is a spherical surface having an apical radius of curvature of 8.6 mm:

| Lens No. | Corrective power (D) | Apical radius of curvature (mm) | Eccentricity | Center thickness (mm) |
| --- | --- | --- | --- | --- |
| 1 | −10 | 10.73 | −.56 | 0.10 |
| 2 | −8 | 10.24 | −.49 | 0.10 |
| 3 | −6 | 9.79 | −.39 | 0.12 |
| 4 | −4 | 9.38 | −.26 | 0.15 |
| 5 | −2 | 9.00 | .16 | 0.17 |
| 6 | 0 | 8.66 | .33 | 0.20 |
| 7 | 2 | 8.34 | .42 | 0.23 |
| 8 | 4 | 8.05 | .47 | 0.25 |
| 9 | 6 | 7.78 | .51 | 0.28 |
| 10 | 8 | 7.51 | .53 | 0.30 |

* * * * *